United States Patent
Riebe

(10) Patent No.: US 9,926,991 B2
(45) Date of Patent: Mar. 27, 2018

(54) DAMPED HEATSINK DISK BRAKE ASSEMBLY

(71) Applicant: Goodrich Corporation, Charlotte, NC (US)

(72) Inventor: Gary C. Riebe, Tipp City, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 12 days.

(21) Appl. No.: 14/943,510

(22) Filed: Nov. 17, 2015

(65) Prior Publication Data
US 2017/0138422 A1    May 18, 2017

(51) Int. Cl.
| | |
|---|---|
| *F16D 55/36* | (2006.01) |
| *F16D 55/24* | (2006.01) |
| *B64C 25/42* | (2006.01) |
| *F16D 65/00* | (2006.01) |
| F16D 55/00 | (2006.01) |
| F16D 65/02 | (2006.01) |

(52) U.S. Cl.
CPC ............ *F16D 55/24* (2013.01); *B64C 25/42* (2013.01); *F16D 55/36* (2013.01); *F16D 65/0006* (2013.01); *F16D 2055/0058* (2013.01); *F16D 2065/132* (2013.01); *F16D 2065/1328* (2013.01)

(58) Field of Classification Search
CPC ....... F16D 2065/132; F16D 2065/1328; F16D 55/24; F16D 55/36; F16D 55/40
See application file for complete search history.

(56) References Cited

U.S. PATENT DOCUMENTS

| | | | | |
|---|---|---|---|---|
| 3,800,392 A | * | 4/1974 | Cook | F16C 35/06 188/218 XL |
| 4,585,096 A | * | 4/1986 | Bok | F16D 13/648 188/71.5 |
| 4,878,563 A | * | 11/1989 | Baden | F16D 55/36 188/251 A |
| 5,143,184 A | * | 9/1992 | Snyder | F16D 13/64 188/218 A |
| 5,551,534 A | * | 9/1996 | Smithberger | F16D 55/36 188/250 B |
| 5,788,035 A | * | 8/1998 | Avers | F16D 13/648 192/107 C |
| 6,340,075 B1 | | 1/2002 | Bok et al. | |

(Continued)

FOREIGN PATENT DOCUMENTS

| | | | | |
|---|---|---|---|---|
| EP | 0480358 | 4/1992 | | |
| EP | 2818749 | 12/2014 | | |
| WO | WO 8000735 A1 | * | 4/1980 | ......... F16D 65/0006 |

OTHER PUBLICATIONS

European Search Report dated Jul. 21, 2017 in EP Application No. 16198711.0.

*Primary Examiner* — Nicholas J Lane
(74) *Attorney, Agent, or Firm* — Snell & Wilmer, L.L.P.

(57) ABSTRACT

Systems disclosed herein may be useful for use in a disk brake system. In this regard, a disk brake system may comprise a stator thickness that is less than 15% greater than an end plate thickness and/or pressure plate thickness. Additionally, a disk brake system may further comprise a combination of split friction disks comprising a damping feature and solid friction disks. These split friction disks and/or solid friction disks may be arranged together in any suitable pattern or position within the disk brake system.

17 Claims, 11 Drawing Sheets

(56) References Cited

U.S. PATENT DOCUMENTS

| | | | |
|---|---|---|---|
| 6,746,771 B2* | 6/2004 | Ottinger | C04L 335/522 |
| | | | 428/103 |
| 7,168,528 B1 | 1/2007 | Bok et al. | |
| 8,573,369 B2 | 11/2013 | Scelsi et al. | |
| 8,978,843 B2 | 3/2015 | Kirkpatrick et al. | |
| 9,127,731 B2 | 9/2015 | Kirkpatrick | |
| 9,482,299 B1* | 11/2016 | Kirkpatrick | F16D 65/12 |
| 2004/0112687 A1 | 6/2004 | Mcafee | |
| 2006/0272904 A1* | 12/2006 | Soellner | F16D 55/40 |
| | | | 188/71.7 |
| 2010/0000070 A1* | 1/2010 | La Forest | C04B 35/83 |
| | | | 29/525.06 |
| 2012/0118685 A1* | 5/2012 | Johnson | B64C 25/42 |
| | | | 188/218 XL |
| 2012/0153753 A1 | 6/2012 | Hanlon | |
| 2014/0174863 A1* | 6/2014 | Kirkpatrick | F16D 55/36 |
| | | | 188/218 XL |
| 2015/0001008 A1* | 1/2015 | Kirkpatrick | B64C 25/42 |
| | | | 188/71.5 |
| 2015/0001009 A1* | 1/2015 | Chambard | B60T 1/065 |
| | | | 188/71.5 |
| 2015/0001017 A1* | 1/2015 | Kirkpatrick | F16D 65/12 |
| | | | 188/218 XL |

* cited by examiner

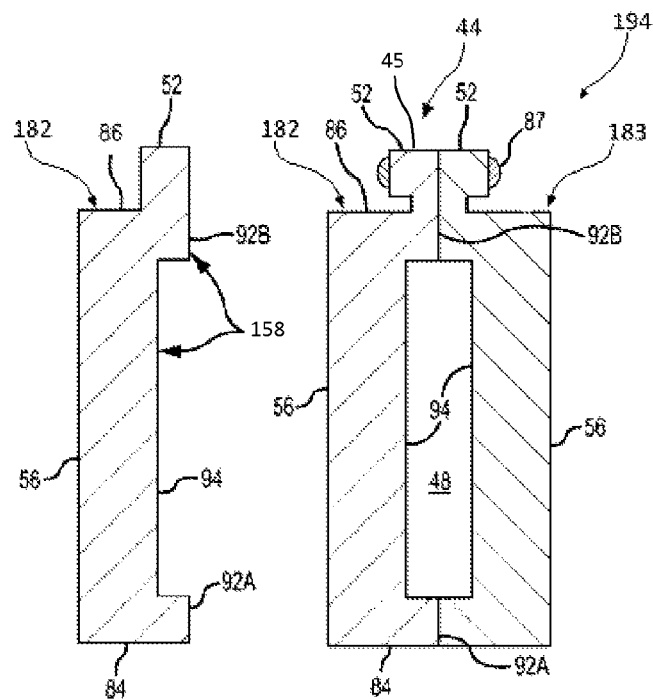
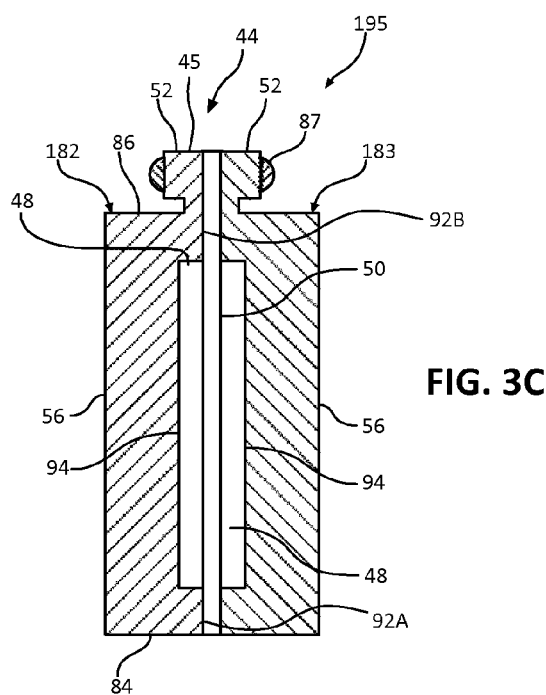
FIG. 3A  FIG. 3B
FIG. 3C

DAMPED HEATSINK DISK BRAKE ASSEMBLY

BACKGROUND

Aircraft brake assemblies encounter large amounts of torque when in use. The aircraft brake assemblies for large aircraft may exhibit vibrations during use, potentially making the brake assembly less effective. In addition, friction disks used in brake systems are limited in their thickness, making it difficult to manufacture thick friction disks as unitary pieces.

SUMMARY

In various embodiments, a disk brake system may comprise a pressure plate coupled to a rotor friction disk, and a stator friction disk located between the pressure plate and an end plate. The rotor friction disk, stator friction disk, pressure plate, and end plate may all be annular disks, and the rotor friction disk and the stator friction disk may be adjacent to one another and disposed coaxially. The end plate thickness, the rotor thickness, the pressure plate thickness, and the stator thickness are measured axially, and the stator thickness may be less than 15% greater than the pressure plate thickness. The pressure late thickness may be greater than the rotor thickness. In various embodiments, the stator thickness may be less than 15% greater than the end plate thickness. The end plate thickness may be greater than the rotor thickness. The disk brake system may comprise a plurality of rotor friction disks and a plurality of stator friction disks, wherein the locations of the stator frictions disks alternate axially with the locations of the rotor friction disks. There may be one more rotor friction disk than there are stator friction disks. One or more of the rotor friction disks and/or stator friction disks may be a split friction disk, and a split friction disk half may comprise a disk half thickness than is substantially equal to the rotor thickness. The split friction disk may be located in a middle position of the disk brake system. In various embodiments, there may be a damping feature between a split friction disk first half and a split friction disk second half.

In various embodiments, a disk brake system may comprise a pressure plate coupled axially to a rotor friction disk, a stator friction disk, located axially between the pressure plate and an end plate, wherein the rotor friction disk, stator friction disk, end plate, and pressure plate may all be annular disks. The rotor friction disk and the stator friction disk may be adjacent to one another and disposed coaxially, wherein at least one of the rotor friction disk and the stator friction disk may be a split friction disk. The disk brake assembly may further comprise a damping feature located axially between a split friction disk first half and a split friction disk second half. The damping feature may have a density that is less than the rotor density and the stator density. The rotor density and the stator density may be 1.7 grams per cubic centimeter, and the damping feature may have a density of between 1.4 and 1.5 grams per cubic centimeter. The stator thickness may be less than 15% greater than the end plate thickness. A first disk half thickness and a second disk half thickness may be greater than a half of the stator thickness. The split friction disk may comprise an annular-shaped disk half comprising a friction surface and a non-friction surface on a side opposite of the friction surface. The non-friction surface may comprise a first contact surface and a second contact surface, and a non-contact surface recessed from both the first contact surface and the second contact surface.

In various embodiments, a plurality of the split friction disks may be positions adjacent to at least one of the pressure plate and/or the end plate. The disk brake system may comprise a plurality of rotor friction disks and a plurality of stator friction disks, wherein the locations of the stator friction disks alternate axially with locations of the rotor friction disks. There may be one more rotor friction disk than there are stator friction disks. The split friction disk may be located in a middle position of the disk brake system. At least one of the rotor friction disks and the stator friction disks may be a solid friction disk. A plurality of solid friction disks may be positioned adjacent to at least one of the pressure plate and the end plate.

In various embodiments, a wheel assembly may comprise a disk brake system, wherein the disk brake system may comprise a pressure plate coupled to a rotor friction disk, a stator friction disk located between the pressure plate and an end plate, wherein the rotor friction disk, stator friction disk, end plate, and pressure plate may all be annular disks, wherein at least one of the rotor friction disk and the stator friction disk is a split friction disk, and a damping feature located between a first half of the at least one split friction disk and a second half of the at least one split friction disk. The rotor friction disk and the stator friction disk may be adjacent to one another and disposed coaxially. The thicknesses of the pressure plate and the stator friction disk are measured axially, and the stator thickness may be less than 15% greater than the pressure plate thickness.

BRIEF DESCRIPTION OF THE DRAWINGS

FIGS. 3A, 3B, and 3C illustrate cross-sectional views of a cavity split friction disk half and disk assembly in accordance with various embodiments;

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the subject matter of the disclosure, it should be understood that other embodiments may be realized and that logical, chemical, and mechanical changes may be made without departing from the spirit and scope of the disclosure. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
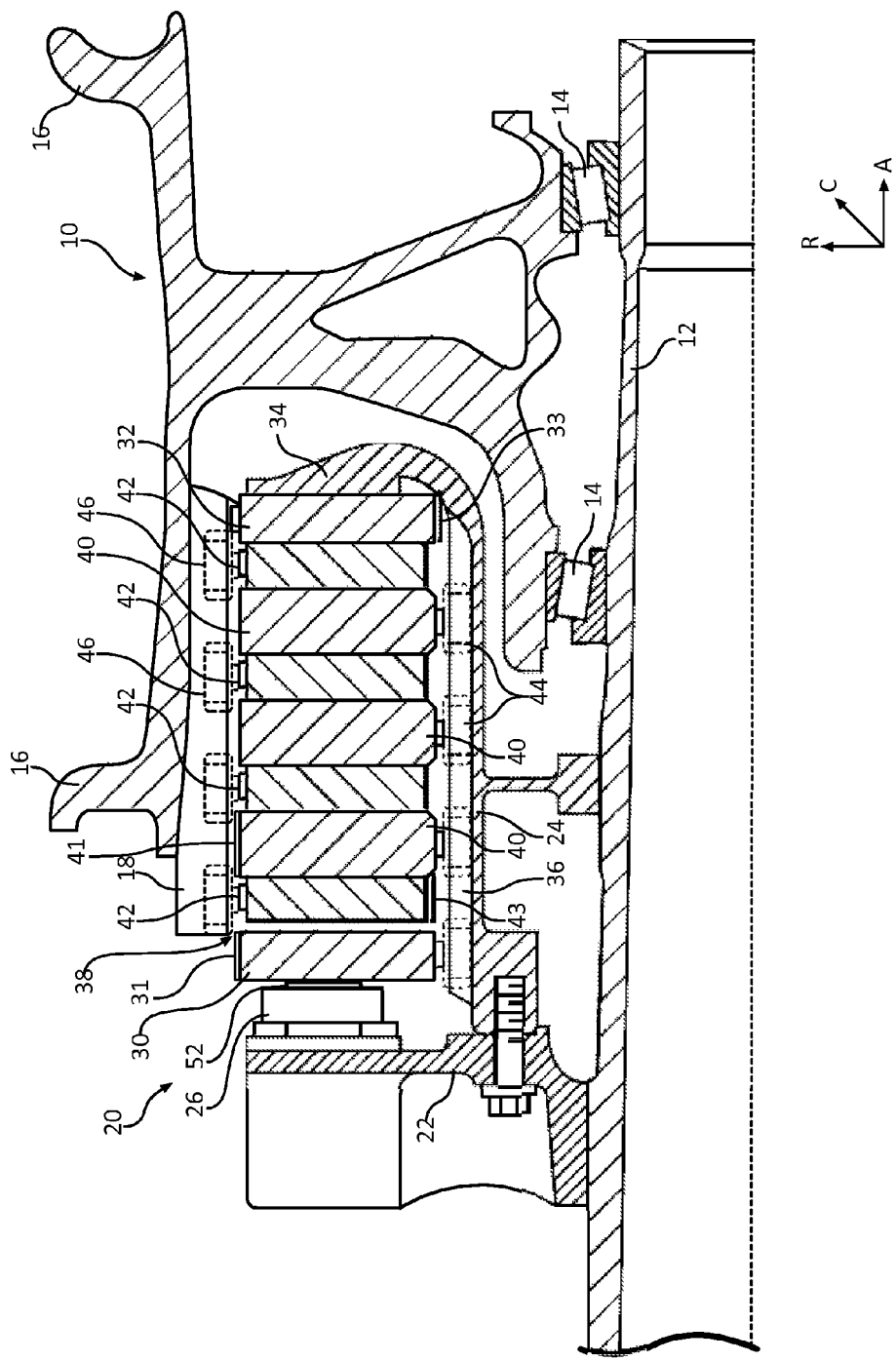
FIG. 1 illustrates a multi-disk brake system, in accordance with various embodiments.

An aircraft brake system, such as disk brake system 20 in FIG. 1, may be used to slow an aircraft while the aircraft is on the ground, for example, during landing. A disk brake system may comprise a combination of split friction disk assemblies and/or solid disk assemblies. These split friction disk assemblies and/or solid disk assemblies may be arranged together in any suitable pattern or position. According to various embodiments, the brake systems described herein employ carbon composite disks that suffer less vibration and generate less brake noise than conventional carbon composite disks brake systems.

With reference to FIG. 1, a disk brake system 20 is illustrated. In various embodiments, the disk brake system 20 may be used to reduce the speed of a wheel of an aircraft. An A-R-C axis has been included in the drawings to illustrate the axial (A), radial (R) and circumferential (C) directions. The system may include a wheel 10 supported for rotation around an axle 12 by bearings 14. The wheel 10 includes rims 16 for supporting a tire, and a series of axially extending rotor splines 18 (one shown). Rotation of the wheel 10 is modulated by the disk brake system 20. The disk brake system 20 includes a torque flange 22, a torque tube 24, a plurality of pistons 26 (one shown), a pressure plate 30, and an end plate 32. In various embodiments, the pressure plate 30 and the end plate 32 are annular disks. The torque tube 24 is an elongated annular structure that includes a reaction plate 34 and a series of axially extending stator splines 36 (one shown). The reaction plate 34 and stator splines 36 may be integral with the torque tube 24 as shown in FIG. 1, or attached as separate components.

In accordance with various embodiments, the disk brake system 20 also includes a plurality of friction disks 38. The plurality of friction disks 38 includes at least one non-rotatable friction disk, also known as a stator friction disk 40, and at least one rotatable friction disk, also known as a rotor friction disk 42. Each of the plurality of friction disks 38 includes an attachment structure. As shown in FIG. 1, each of four stator friction disks 40 include a plurality of stator lugs 44 at circumferentially spaced positions around the stator friction disk 40 as an attachment structure. Similarly, each of five rotor friction disks 42 include a plurality of rotor lugs 46 at circumferentially spaced positions around the rotor friction disk 42 as an attachment structure. In various embodiments, and as shown in FIG. 1, the pressure plate 30, end plate 32, and friction disks 38 are all annular disks.

The torque flange 22 is mounted to the axle 12. The torque tube 24 is bolted to the torque flange 22 such that the reaction plate 34 is near an axial center of the wheel 10. The end plate 32 is connected to a surface of the reaction plate 34 facing axially away from the axial center of the wheel 10. Thus, the end plate 32 is non-rotatable by virtue of its connection to the torque tube 24. The stator splines 36 support the pressure plate 30 so that the pressure plate 30 is also non-rotatable. The stator splines 36 also support the stator friction disks 40. The stator friction disks 40 engage the stator splines 36 with gaps formed between the stator lugs 44. Similarly, the rotor friction disks 42 engage the rotor splines 18 with gaps formed between the rotor lugs 46. Thus, the rotor friction disks 42 are rotatable by virtue of their engagement with the rotor splines 18 of the wheel 10.

As shown in FIG. 1, the rotor friction disks 42 are arranged with the end plate 32 on one end, the pressure plate 30 on the other end, and the stator friction disks 40 interleaved so that the rotor friction disks 42 are adjacent to non-rotatable friction components. In various embodiments, the number of rotor friction disks 42 and stator friction disks 40 may vary according to the brake assembly design. The pistons 26 are connected to the torque flange 22 at circumferentially spaced positions around the torque flange 22. The pistons 26 face axially toward the wheel 10 and include pucks 54 that contact a side of the pressure plate 30 opposite the rotor friction disks 42. The pistons 26 may be powered electrically, hydraulically or pneumatically.

In various embodiments, with further reference to FIG. 1, the pressure plate 30 may be coupled to a rotor friction disk 42. A stator friction disk 40 may be coupled to the rotor friction disk 42, and the stator friction disk 40 and the rotor friction disk 42 may be positioned axially between the pressure plate 30 and an end plate 32. In various embodiments, the pressure plate 30 may, instead, be coupled to a stator friction disk 40. In various embodiments, the plurality of friction disks 38 may be made up of a plurality of stator friction disks 40 and a plurality of rotor friction disks 42, wherein the locations of the stator friction disks 40 alternate axially with the locations of the rotor friction disks 42 between the pressure plate 30 and the end plate 32. There may be one more rotor friction disk 42 than stator friction disks 40 in the plurality of friction disks 38. The disk brake systems contemplated herein may have any number of rotor friction disks 42 and/or stator friction disks 40, such as 5,4; 4,3 (as depicted in FIG. 1); and 3,2, respectively. Conversely, there may be one more stator friction disk 40 than rotor friction disks 42 in the plurality of friction disks 38, or the number of stator friction disks 40 and rotor friction disks 42 may be equal.

In various embodiments, the pressure plate 30 has a pressure plate thickness 31, the end plate 32 has an end plate thickness 33, the stator friction disk 40 has a stator thickness 41, and the rotor friction disk 42 has a rotor thickness 43, all of which may be measured axially. Conventionally, a pressure plate thickness and an end plate thickness are each less than 20% thicker than a half of a stator thickness or a half of a rotor thickness, with the stator thickness and the rotor thickness each being greater than 1.5 inches, making them difficult to manufacture in a single, unitary piece. In various embodiments, friction material has been taken from the stator friction disks 40 and/or rotor friction disks 42 and distributed to the pressure plate 30 and/or the end plate 32. In various embodiments, the pressure plate thickness 31 may be greater than the stator thickness 41 and/or greater than the rotor thickness 43. In various embodiments, the stator thickness 41 and/or the rotor thickness 43 may be less than 15% greater than the pressure plate thickness 31. In various embodiments, the end plate thickness 33 may be greater than the stator thickness 41 and/or greater than the rotor thickness 43. In various embodiments, the stator thickness 41 and/or the rotor thickness 43 may be less than 15% greater than the end plate thickness 33. In various embodiments, the stator thickness 41, the rotor thickness 43, the end plate thickness 33, and the pressure plate thickness 31 may be less than or equal to 1.5 inches.

By making the end plate thickness 33 and/or the pressure plate thickness 31 thicker relative to the stator thickness 41 or the rotor thickness 43, composite material is axially shifted from the stator friction disks 40 and/or rotor friction disks 42 to the end plate 32 and/or the pressure plate 30, making the stator friction disks 40 and/or rotor friction disks 42 thinner than typically manufactured. Such a shift may cause more mass to be on the axial ends of the disk brake system 20, as the pressure plate 30 and the end plate 32 are the outermost disks in the disk brake system 20. Such a configuration may serve to damp vibration in the disk brake system in conjunction with the thinner stator friction disks 40 and/or rotor friction disks 42 of the current disclosure. Also, with decreased stator thickness 41 and/or rotor thickness 43 to less than 1.5 inches, the stator friction disks 40 and/or the rotor friction disks 42 may be able to more easily be manufactured in a single, unitary piece.

In various embodiments, at least one of the friction disks 38 is a split friction disk. The disk brake systems comprising at least one split friction disk may comprise the same or similar pressure plate thickness 31, end plate thickness 33, stator thickness 41, and/or the rotor thickness 43 described in this disclosure, or they may comprise any other disk suitable disk thicknesses. The at least one split friction disk may be a rotor split friction disk, a rotor cavity split friction disk, a stator split friction disk, or a stator cavity split friction disk. In various embodiments, at least one of the plurality of friction disks 38 may be a rotor solid friction disk or a stator solid friction disk. In describing disk brake systems comprising split friction disks, cavity split friction disks, and solid friction disks, the term "rotor friction disks" may mean all rotor solid friction disks, rotor split friction disks, and rotor cavity split friction disks that may be comprised in the disk brake system, but in the figures, "rotor friction disks" means rotor friction disks 42. Similarly, the term "stator friction disks" may mean all stator solid friction disks, stator split friction disks, and stator cavity split friction disks that may be comprised in the disk brake system, but in the figures, "stator friction disks" means stator friction disks 40. The term "split friction disk(s)" may mean all rotor split friction disks, stator split friction disks, rotor cavity split friction disks, and stator cavity split friction disks that may be present in a disk brake system, and the term "solid friction disk(s)" may mean all rotor solid friction disks and stator solid friction disks that may be present in a disk brake system.

Figure 2A:
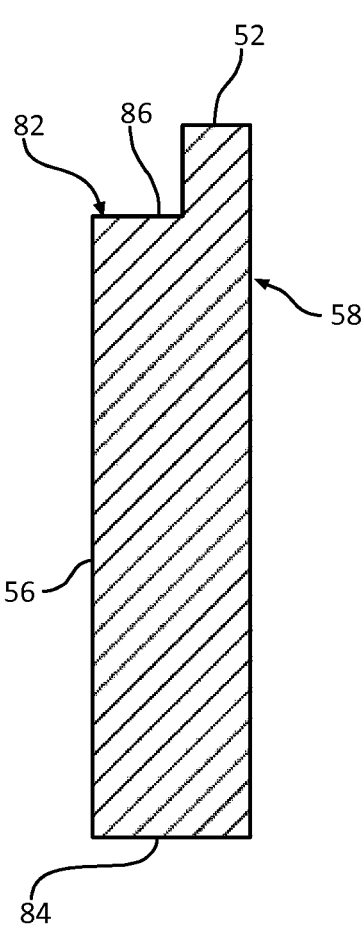
FIGS. 2A and 2B illustrate cross-sectional views of a split friction disk half and disk assembly in accordance with various embodiments.
Figure 2B:
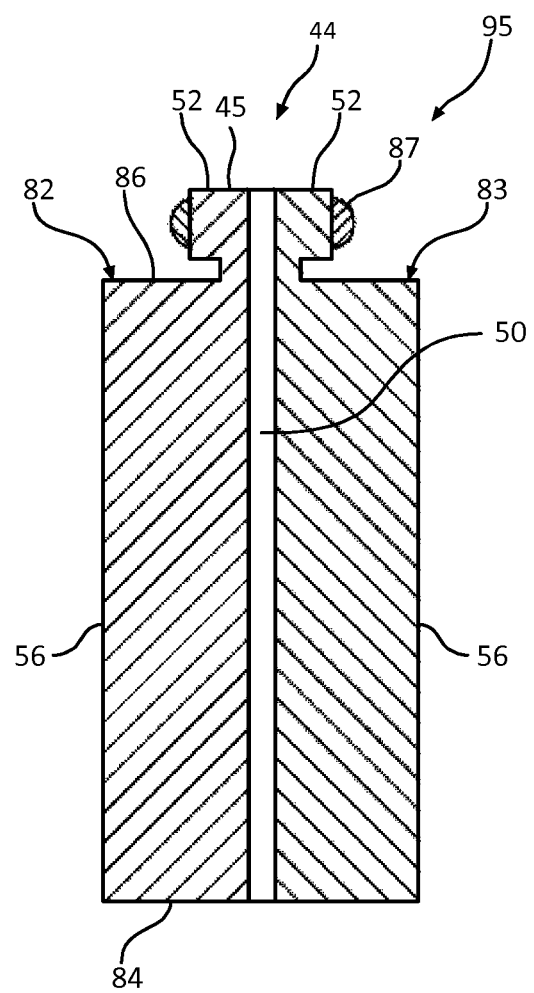

With reference to FIGS. 2A and 2B, an embodiment of a stator split friction disk 95 is depicted. FIG. 2A shows a cross-sectional view of a split friction disk first half 82. FIG. 2B shows a cross-sectional view of a stator split friction disk 95. Considering FIGS. 2A and 2B together, the stator split friction disk 95 includes two disk halves: a split friction disk first half 82 and a split friction disk second half 83. Each disk half 82 and 83 includes an attachment structure in the form of lug half 45, a friction surface 56, and a non-friction surface 58. The friction surface 56 may be at an axial end of the disk halves 82 and 83. The friction surface 56 may be configured for operationally engaging a corresponding friction surface of another disk brake system component, such as a rotor friction disk 42. The non-friction surface 58 may be located at an axial end of the disk halves 82 and 83, such as on a side opposite of the friction surface 56.

The disk halves 82 and 83 further include inner diameter surfaces 84 having a first outer diameter surface 86. The inner diameter surface 84 may be located at a radially inward facing edge of the disk halves 82 and 83. The inner diameter surface 84 may comprise a disk half thickness, and with momentary reference to FIG. 1, the disk half thickness may be greater than half of the stator thickness 41 when a damping feature 50 is disposed between the disk halves 82 and 83. No matter the configuration, the disk half thickness may be less than 1.5 inches. The first outer diameter surface 86 may be located at a radially outward facing edge of the disk halves 82 and 83. The friction surface 56 extends radially between the inner diameter surface 84 and a second outer diameter surface 52. The non-friction surface 58 extends radially between the inner diameter surface 84 and the first outer diameter surface 86. The non-friction surface 58 may be parallel to the friction surface 56.

Each disk half 82 and 83 may include an attachment structure in the form of a lug half 45. The lug half 45 may project radially outward from the first outer diameter surface 86. The disk halves 82 and 83 may be secured to each other by a fastening device. Importantly, while the corresponding non-friction surfaces 58 of the two disk halves 82 and 83 are held in contact with a damping feature 50 between them, they do not form a continuous structure. That is, the corresponding non-friction surfaces 58 are not bonded to each other, in any way, but merely are held together.

In various embodiments, with reference to FIG. 2B, between the disk halves 82 and 83, there may be a damping feature 50 positioned between the non-friction surfaces 58 of the disk halves 82 and 83. The damping feature 50 may be comprised of a less dense material than the material comprised in the stator friction disks 40. The damping feature 50 may be comprised of carbon composite that undergoes a densification process which includes less Z-needling than the densification process for the friction disks 38. Z-needling is a process comprising penetrating a composite material with needles and pulling fibers from the in-plane direction and forcing them into the z direction. In general, the Z-needling process has the effect of interlocking the individual fabric layers together. Thus, after Z needling, the fibrous material has fibers extending in three different directions (i.e., in the x and y directions in the plane of the fibrous layers and the z direction perpendicular to the fibrous layers). Thus, with less Z needling, the damping feature 50 will be comprised of a less dense material because the fibers will be less intertwined.

In various embodiments, the damping feature 50 may have a density of 1.4-1.5 grams per cubic centimeter (14-15 pounds per gallon), a density of 1.4 grams per cubic centimeter (14 pounds per gallon), or a density of 1.5 (15 pounds per gallon) grams per cubic centimeter. The friction disks 38, including stator friction disks having a stator density and the rotor friction disks having a rotor density, may have a density of 1.7 grams per cubic centimeter (17 pounds per gallon). With the damping feature 50 having a lower density, the damping feature 50 absorbs energy caused by vibrations occurring between the friction disks 38 of the disk brake system, resulting in a damping effect. The damping feature 50 may be held in place between the disk halves 82 and 83 by a rivet 87 which goes through the lug halves 45 of the disk halves 82 and 83.

Although the embodiment of FIGS. 2A and 2B is described in terms of stator split friction disk 95, it is understood that the same description and features apply generally to either stator split friction disks 95 or rotor split friction disks 90, and if applied to rotor split friction disk 90, the difference would be that lug 44 at first outer diameter surface 86 is replaced by lug 46 at inner diameter surface 84.

In various embodiments, the at least one split friction disk may further comprise a cavity in each disk half, as depicted in FIGS. 3A-3C. Referring to FIGS. 3B and 3C, an example of stator cavity split friction disk 194 and 195 with a cavity 48 is depicted, respectively. FIG. 3A shows a cross-sectional view of cavity split friction disk first half 182. FIG. 3B shows a cross-sectional view of stator cavity split friction disk 194. Considering FIGS. 3A and 3B together, stator cavity split friction disk 194 includes two cavity disk halves: a cavity split friction disk first half 182 and a cavity split friction disk second half 183. Each cavity disk half 182 and 183 includes an attachment structure in the form of lug half 45, a friction surface 56, and a non-friction surface 158. The friction surface 56 may be at an axial end of the cavity disk halves 182 and 183. The friction surface 56 may be configured for operationally engaging a corresponding friction surface of another disk brake system component, such as a rotor friction disk 42. The non-friction surface 158 may be located at an axial end of the disk halves 182 and 183, such as on a side opposite of the friction surface 56. The non-friction surface 158 may include contact surfaces 92A, 92B and a non-contact surface 94. The non-contact surface 94 is recessed from the contact surfaces 92A, 92B and, in this embodiment, the contact surfaces 92A, 92B may be substantially parallel to the non-contact surface 94. The contact surfaces 92A, 92B may be configured for contacting a non-friction surface of another disk brake system component, such as the damping feature 50.

The cavity disk halves 182 and 183 further includes an inner diameter surface 84 and a first outer diameter surface 86. The inner diameter surface 84 may be located at a radially inward facing edge of the cavity disk halves 182 and 183. The inner diameter surface 84 may comprise a disk half thickness. With momentary reference to FIG. 1, the disk half thickness may be greater than half of the stator thickness 41 in a configuration in which the damping feature 50 is disposed between the disk halves 182 and 183 as depicted in FIG. 3C. If there is no damping feature disposed between the disk halves 182 and 183, as depicted in FIG. 3B, the disk half thickness may be substantially equal to the rotor thickness. No matter the configuration, the disk half thickness may be less than 1.5 inches. The first outer diameter surface 86 may be located at a radially outward facing edge of the cavity disk halves 182 and 183. The friction surface 56 may extend radially between the inner diameter surface 84 and the second outer diameter surface 52. The non-friction surface 158 may extend radially between the inner diameter surface 84 and the first outer diameter surface 86. The contact surfaces 92A, 92B may be parallel to the friction surface 56 and include an inner diameter portion 92A and an outer diameter portion 92B. The inner diameter portion 92A may be radially between the non-contact surface 94 and the inner diameter surface 84. The outer diameter portion 92B may be radially between the non-contact surface 94 and the second outer diameter surface 52. The non-contact surface 94 may be radially between the inner diameter surface 84 and the first outer diameter surface 86. The non-contact surface 94 extends circumferentially around at least a portion of the cavity disk halves 182 and 183.

Each cavity disk half 182 and 183 may include an attachment structure in the form of a lug half 45. The lug half 45 may project radially outward from the first outer diameter surface 86. As shown in FIG. 3C, the cavity disk halves 182 and 183 are assembled such that their respective contact surfaces 92A, 92B are in physical contact with a damping feature 50, on opposing sides of the damping feature 50, to form stator cavity split friction disk 194. The cavity disk halves 182 and 183 may be secured to each other by a fastening device. In the illustrated embodiment, the fastening device is the rivet 87. Once assembled, stator cavity split friction disk 194 includes cavity 48, as shown in FIG. 3B, or cavities 48 on either side of the damping feature 50 formed by the recessed non-contact surfaces 94 of the two cavity disk halves 182 and 183, as shown in FIG. 3C. The cavities 48 absorb energy created by vibrations within the brake system, and thus, have a damping effect. Importantly, while the corresponding non-friction surfaces 158 of the two cavity disk halves 182 and 183 are held in contact with each other in FIG. 3B, or with a damping feature 50 in FIG. 3C, they do not form a continuous structure. That is, the corresponding contact surfaces 92A, 92B are not bonded to each other, or the damping feature 50, in any way, but merely are held together. The description of stator cavity split friction disk 194 and its elements also applies to the elements of stator cavity split friction disk 195 depicted in FIG. 3C.

In various embodiments, with reference to FIG. 3C illustrating a stator cavity split friction disk 195, between the cavity disk halves 182 and 183, there may be a damping feature 50 positioned between the contact surfaces 92A,B of the cavity disk halves 182 and 183, and a cavity 48 on either side of the damping feature 50. The damping feature 50 may be comprised of a less dense material than the material comprised in the stator friction disks 40. The damping feature 50 may be comprised of carbon composite that undergoes a densification process which includes less Z-needling than the densification process for the friction disks. In various embodiments, the damping feature 50 may have a density of 1.4-1.5 grams per cubic centimeter (14-15 pounds per gallon), a density of 1.4 grams per cubic centimeter (14 pounds per gallon), or a density of 1.5 grams per cubic centimeter (15 pounds per gallon). The friction disks 38 may have a density of 1.7 grams per cubic centimeter (17 pounds per gallon). With the damping feature 50 having a lower density, the damping feature 50 absorbs energy caused by vibrations occurring between the friction disks 38 of the disk brake system, resulting in a damping effect. The damping feature 50 may be held in place between the cavity disk halves 182 and 183 by the same rivet 87 through the lug halves 45 of the cavity disk halves 182 and 183.

Although the embodiments of FIGS. 3A, 3B, and 3C are described in terms of stator cavity split friction disks 194 and 195, it is understood that the same description and features apply generally to either a stator cavity split friction disk 194 or 195 or a rotor cavity split friction disks 189 or 190, and if applied to a rotor cavity split friction disk 189 or 190, the difference would be that lug 44 at first outer diameter surface 86 is replaced by lug 46 at inner diameter surface 84.

Figure 4:
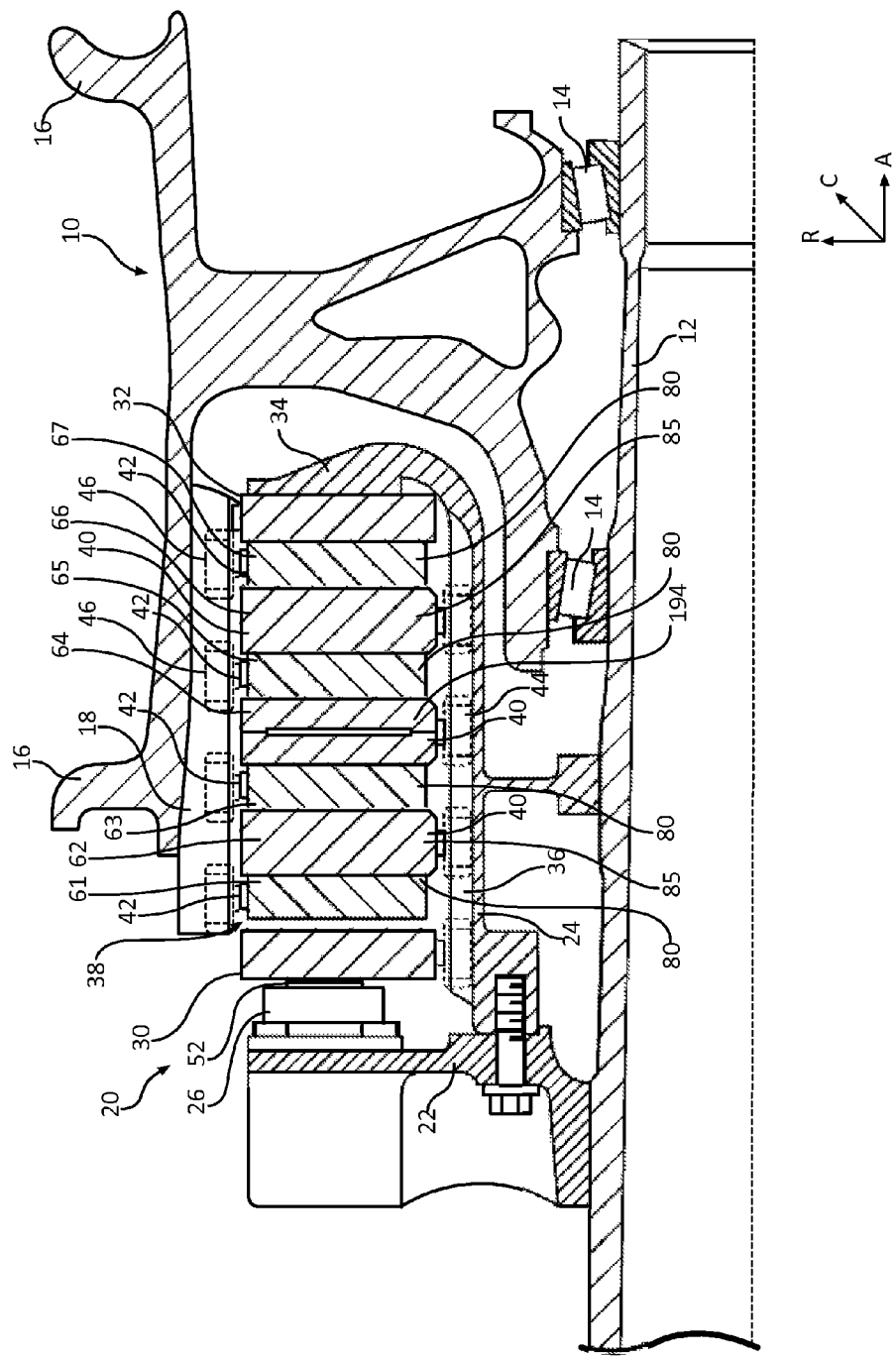
FIG. 4 illustrates a multi-disk brake system, in accordance with various embodiments.
Figure 5:
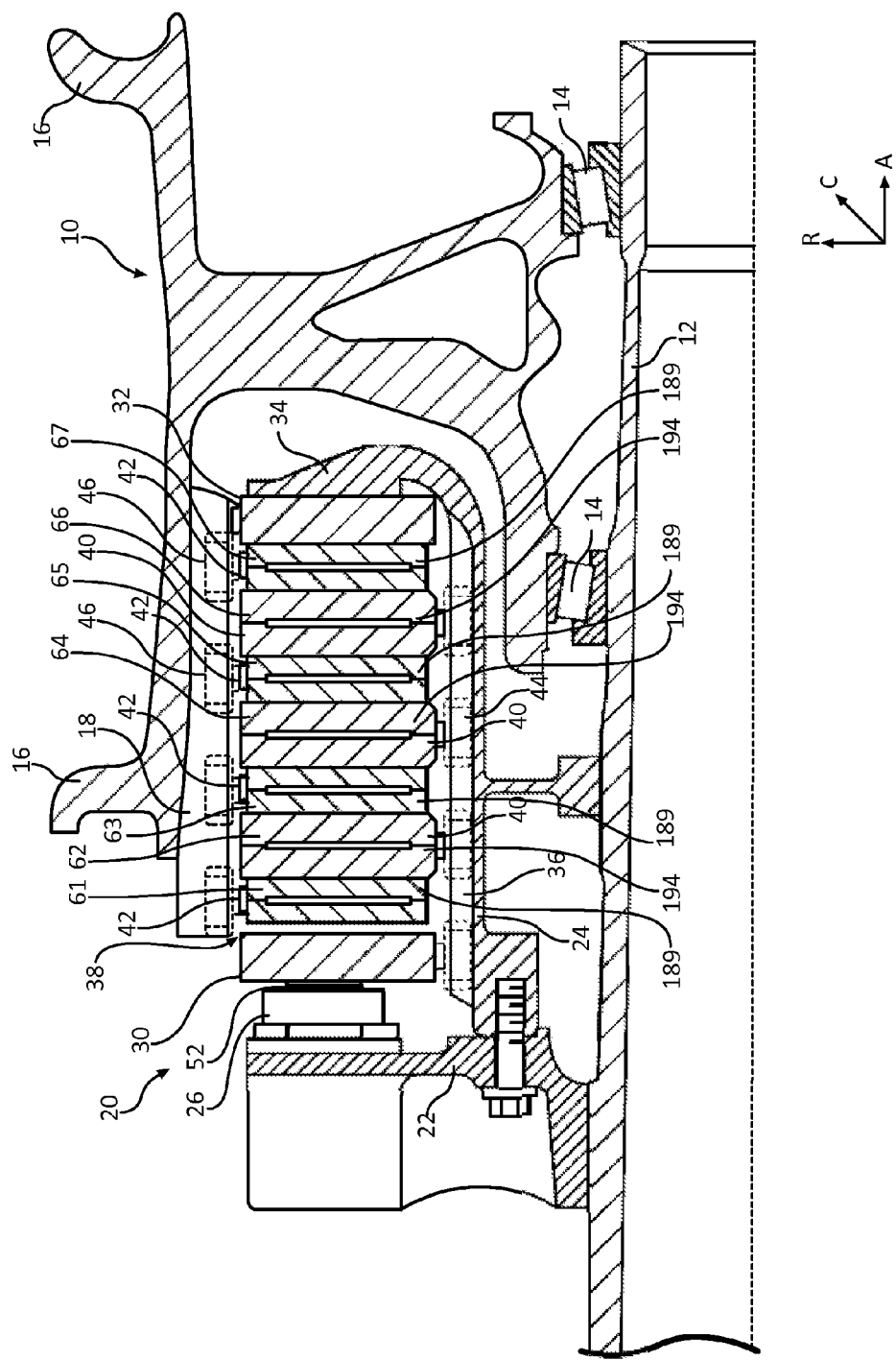
FIG. 5 illustrates a multi-disk brake system, in accordance with various embodiments.

In various embodiments, the at least one rotor split friction disk 90, rotor cavity split friction disk 189, 190, stator split friction disk 95, and/or stator cavity split friction disk 194, 195 may be positioned anywhere within the plurality of friction disks 38. With respect to FIGS. 4-11, elements with the like element numbering as depicted in FIG. 1, are intended to be the same and will not be repeated for the sake of clarity. In various embodiments, the split friction disk 90, 95, 189, 190, 194, or 195 may be positioned in a middle position of the plurality of friction disks 38. The middle position being the position on either side of which, there is an equal number of split friction disks 38. With reference to FIG. 4 in accordance with various embodiments, the stator cavity split friction disk 194 may be positioned in the middle position 64 of the plurality of split friction disks 38. Positions 61, 63, 65, and 67 may be rotor solid friction disks 80, and positions 62 and 66 may be stator solid friction disks 85. With reference to FIG. 5 all disks of the plurality of split friction disks 38 may be split friction disks: positions 61, 63, 65, and 67 may be rotor cavity split friction disks 189, and positions 62, 64, and 66 may comprise stator cavity split friction disks 194. In various embodiments, the stator cavity split friction disk 194 may comprise disk halves 182 and 183 that may have disk half thicknesses, measured along in the inner diameter surfaces 84, that are substantially equal to the rotor thickness 43.

Figure 6:
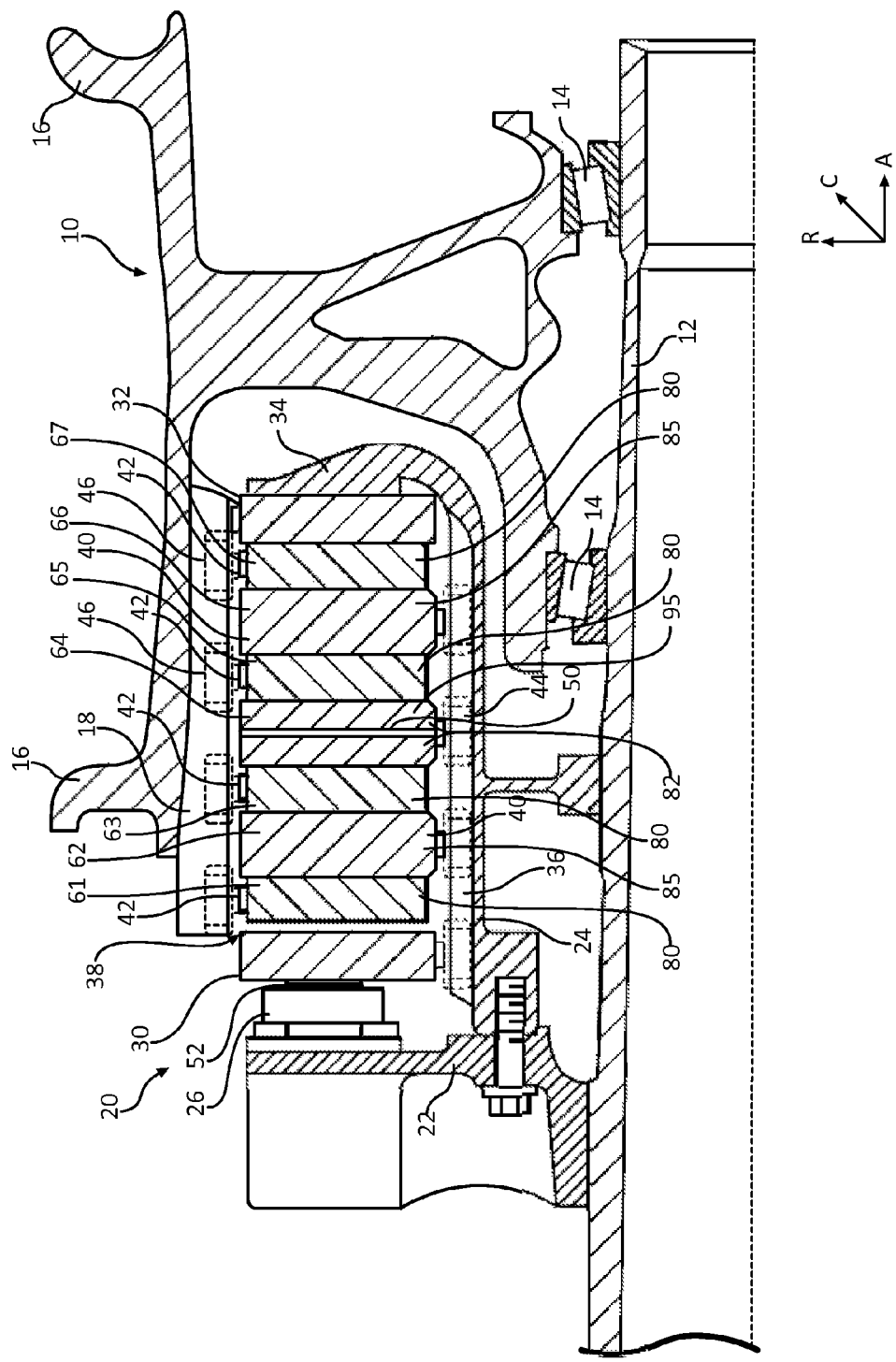
FIG. 6 illustrates a multi-disk brake system, in accordance with various embodiments.
Figure 7:
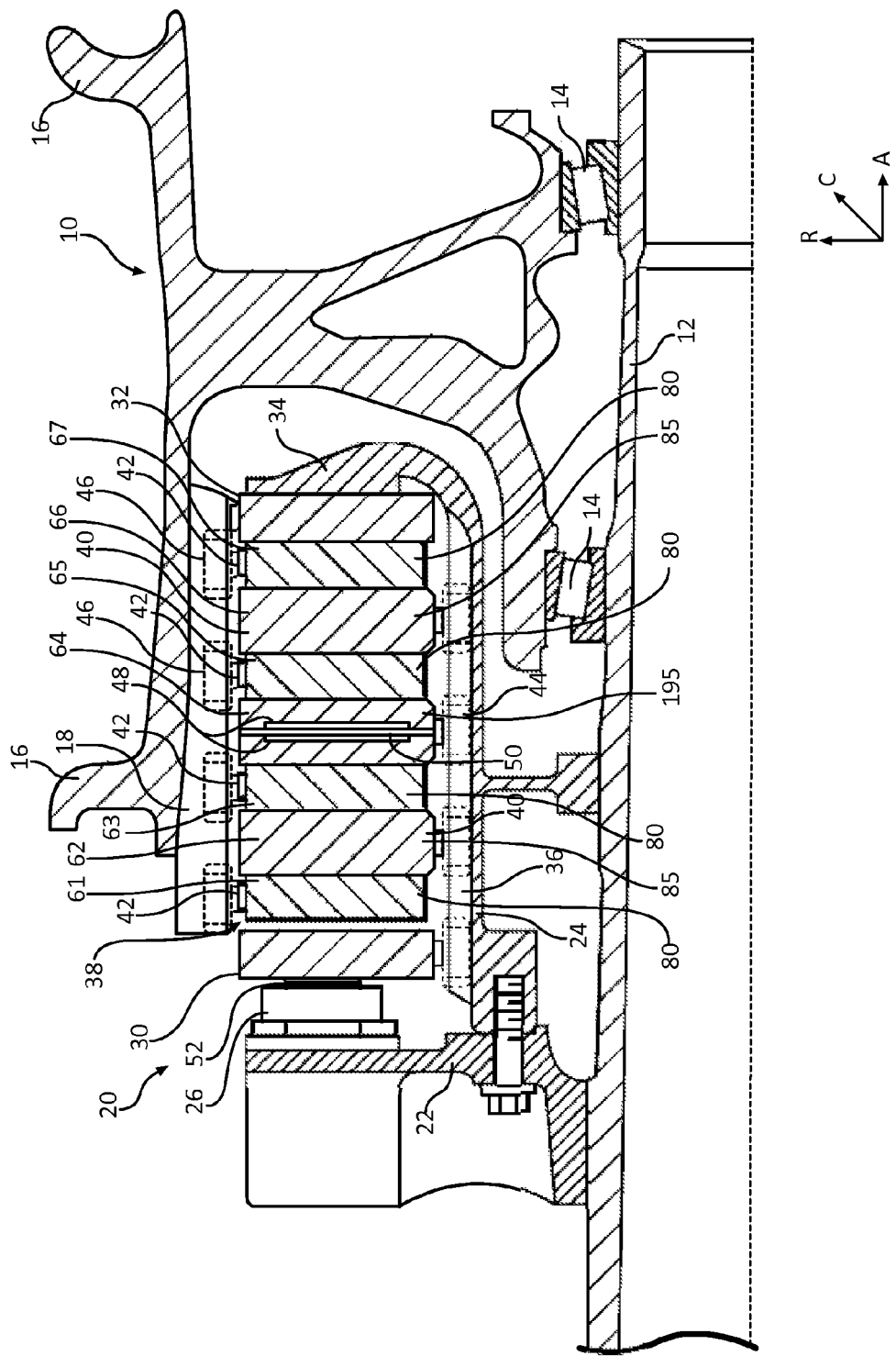
FIG. 7 illustrates a multi-disk brake system, in accordance with various embodiments.

With reference to FIG. 6, in various embodiments, the stator split friction disk 95 with the damping feature 50 may be positioned in a middle position 64 of the plurality of friction disks 38. With reference to FIG. 7, the stator cavity split friction disk 195, comprising the cavities 48 and the damping feature 50, may be positioned in a middle position 64 of the plurality of friction disks 38. In various embodiments, the stator split friction disk 95, and cavity split friction disk 194, may comprise disk halves 82 and 83, and 182 and 183, respectively that may have disk half thicknesses, measured along in the inner diameter surfaces 84, that are greater than half of the stator thickness 41. In various embodiments, the middle position of a disk brake system may be a rotor friction disk 40, rather than a stator friction disk 42. In the embodiments depicted in FIGS. 6 and 7, in the plurality of friction disks 38, positions 61, 63, 65, and 67 may comprise rotor solid friction disks 80, and positions 62 and 66 may comprise stator solid friction disks 85. The stator cavity split friction disks 195 with the damping feature 50 may comprise a damped stator cavity split friction disk thickness, which may be the total thickness of the cavity disk halves 182 and 183 and the damping feature 50, that is substantially equal to double the rotor thickness 43.

Figure 8:
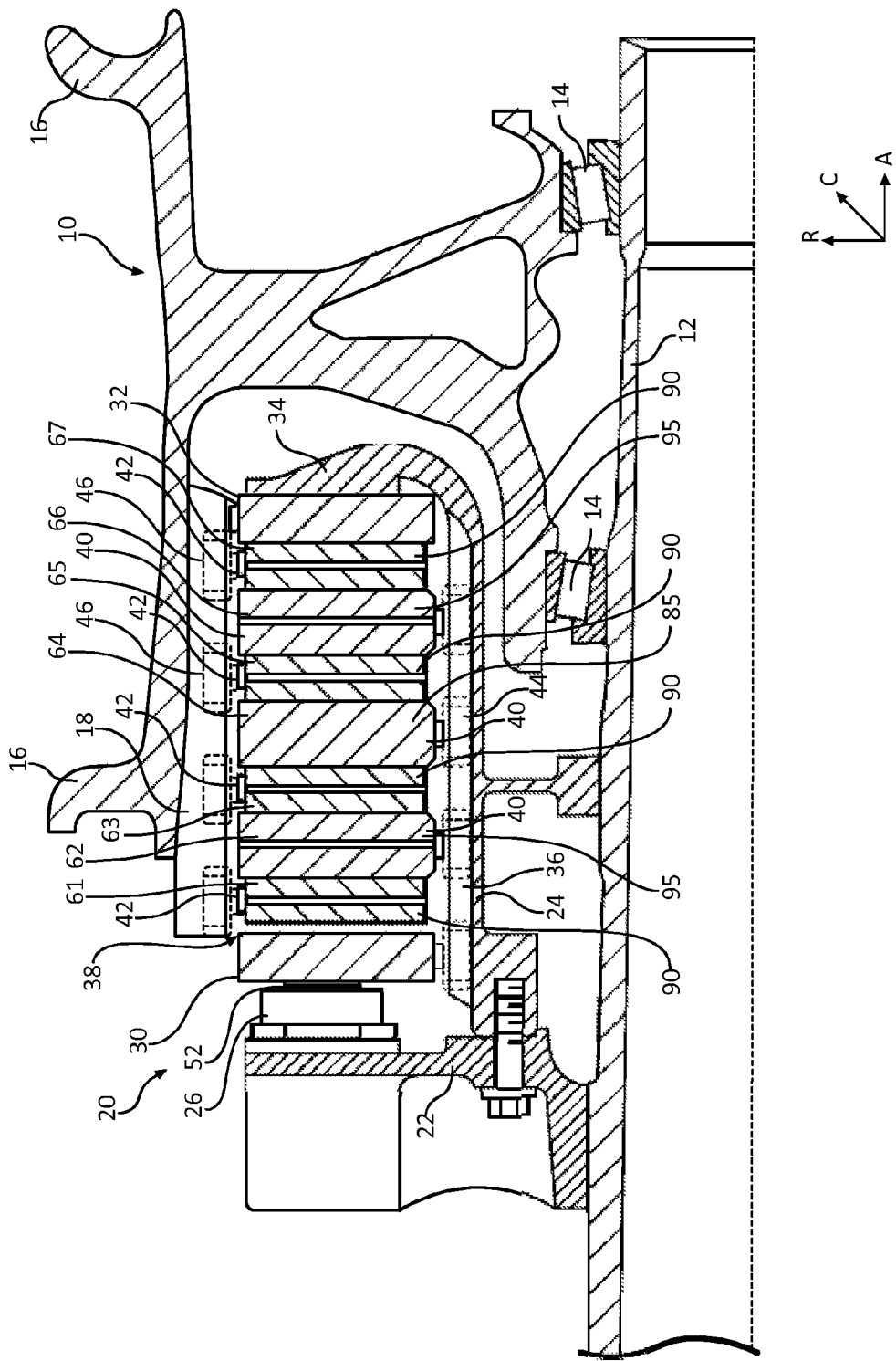
FIG. 8 illustrates a multi-disk brake system, in accordance with various embodiments.
Figure 9:
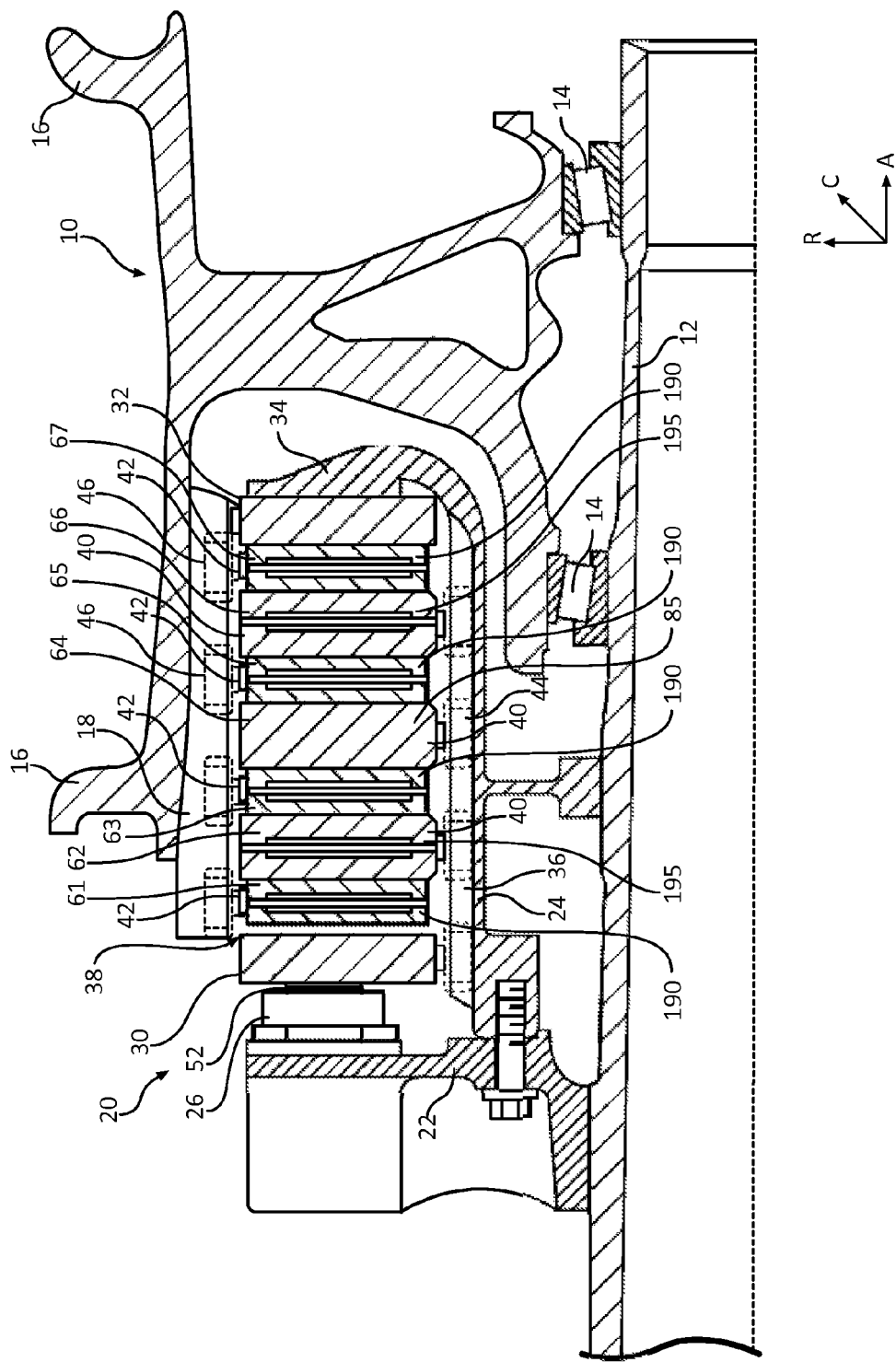
FIG. 9 illustrates a multi-disk brake system, in accordance with various embodiments.
Figure 10:
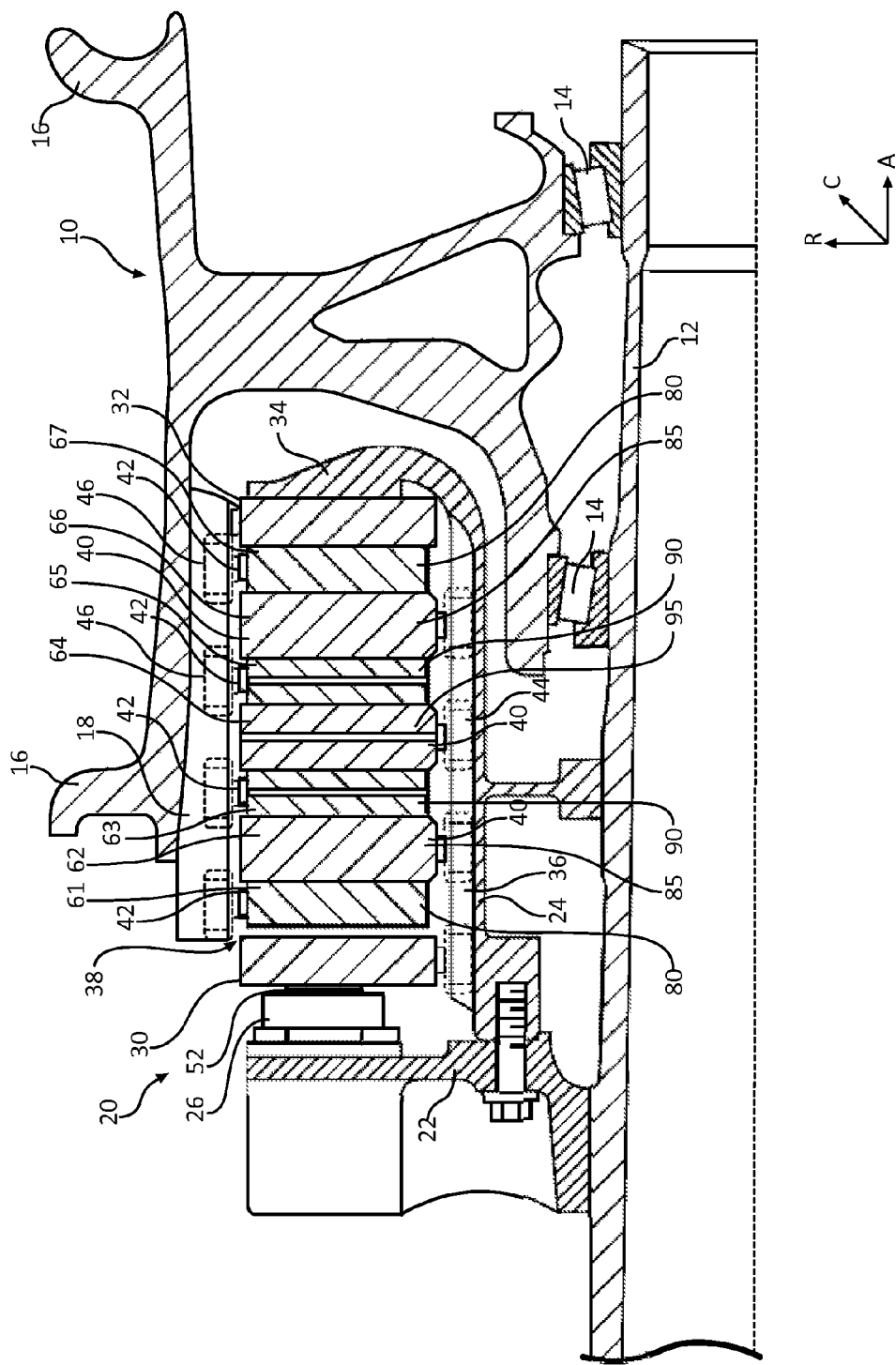
FIG. 10 illustrates a multi-disk brake system, in accordance with various embodiments.
Figure 11:
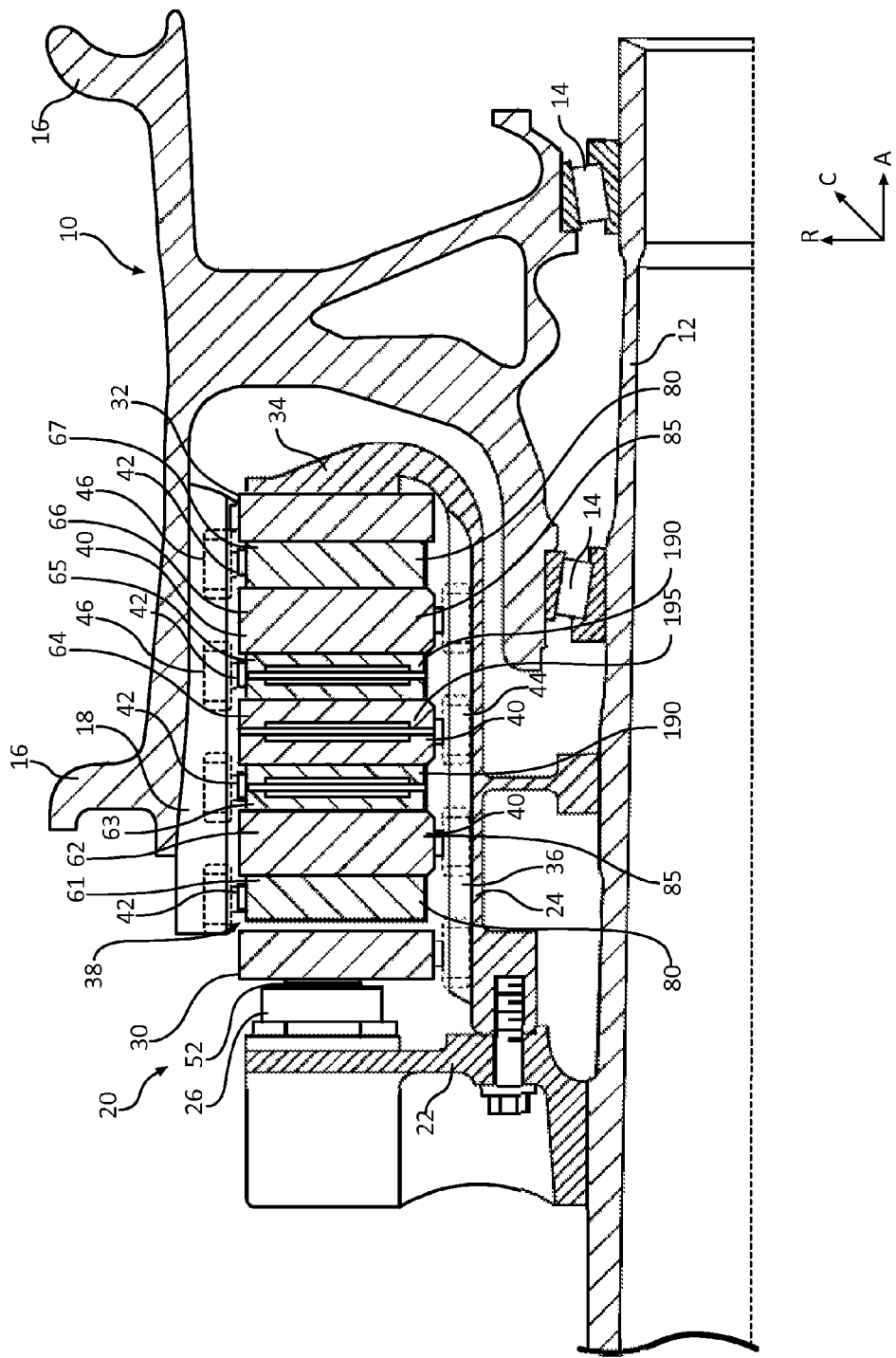
FIG. 11 illustrates a multi-disk brake system, in accordance with various embodiments.

In various embodiments, the split friction disk 90, 95, 189, 190, 194, and/or 195, may be positioned in various other positions in the plurality of friction disks 38. With reference to FIG. 8, in the plurality of friction disks 38, positions 61, 63, 65, and 67 of the plurality of friction disks 38 may comprise rotor split friction disks 90, positions 62 and 66 may comprise stator split friction disks 95, and position 64 may comprise stator solid friction disk 85. With reference to FIG. 9, in the plurality of friction disks 38, positions 61, 63, 65, and 67 may comprise rotor cavity split friction disks 190, positions 62 and 66 may comprise stator cavity split friction disks 195, and position 64 may comprise stator solid friction disk 85. With reference to FIG. 10, in the plurality of friction disks 38, positions 63 and 65 may comprise rotor split friction disks 90, position 64 may comprise a stator split friction disk 95, positions 61 and 67 may comprise rotor sold friction disks 80, and positions 62 and 66 may comprise stator solid friction disks 85. With reference to FIG. 11, in the plurality of friction disks 38, positions 63 and 65 may comprise rotor cavity split friction disks 190, position 64 may comprise stator cavity split friction disk 195, positions 61 and 67 may comprise rotor sold friction disks 80, and positions 62 and 66 may comprise stator solid friction disks 85. In various embodiments, all rotor friction disks 42 may be split friction disks, and/or all stator friction disks 40 may be split friction disks, and split friction disks 90, 95, 189, 190, 194, and/or 195 may be present in the same disk brake system in any number or configuration. In various embodiments, all disks in a disk brake system may comprise split friction disks. Vibration may be a location-dependent phenomenon within a disk brake system, so locating split friction disks 90, 95, 189, 190, 194, and/or 195 in suitable positions in a disk brake system may provide a vibration damping effect. Thus, the location of split friction disks 90, 95, 189, 190, 194, and/or 195 "tunes" the damping characteristics of a disk brake system based on their locations.

Considering FIGS. 4 and 2A,B together, prior to operation of the disk brake system, pistons 26 are not actuated and gaps exist between each of rotor friction disks 42 and each of the non-rotatable friction components, namely pressure plate 30, end plate 32, and stator friction disks 40. The gaps are formed by the axial spreading out of the rotor friction disks 42 along the rotor splines 18; and the stator friction disks 40, and the pressure plate 30 along the stator splines 36 due to the movement of the rotor friction disks 42 adjacent to the non-rotatable friction components. During operation of the disk brake system, pistons 26 are actuated, forcing the pressure plate 30 to move along stator splines 36 against the plurality of the friction disks 38, forcing them axially toward the end plate 32 and reaction plate 34. Squeezed between the pressure plate 30 and the reaction plate 34, the gaps are eliminated as friction surfaces contact other friction surfaces. Drag generated by the contact of the friction surfaces acts to slow the rotor friction disks 42 and the wheel 10. The drag can generate vibration within the plurality of friction disks 38, and also can generate significant heat. Vibration can be damped by any split friction disks, which can also absorb heat along with solid friction disks. As depicted in FIG. 4, stator split friction disk 194 in position 64 of the plurality of split friction disks 38 would damp any vibration and absorb any heat generated by the disk brake system. While this description of the operation of a disk brake system is applied to the disk brake system depicted in FIG. 4, it is understood that this description is also applicable to any disk brake system comprising a split friction disk, including those depicted in any of the FIGS. 5-11.

Brake vibration tends to be significantly damped by any split friction disks in a brake system. Rotor split friction disks 90 and stator split friction disks 95 are assembled from two disk halves 82 and 83 such that non-friction surface 58 of disk halves 82 are in physical contact on opposing sides of the damping feature 50, but do not form a continuous structure. Similarly, rotor cavity split friction disks 190 and stator cavity split friction disks 195 are assembled from two cavity disk halves 182 and 183 such that contact surfaces 92A,B of cavity disk halves 182 and 183 are in physical contact on opposing sides of the damping feature 50, but do not form a continuous structure. Thus, vibration is damped at non-friction surface 58 for rotor split friction disks 90 and stator split friction disks 95, and at contact surfaces 92A,B for rotor cavity split friction disks 190 and stator cavity split friction disks 195, even though brake pressure is satisfactorily transmitted to and from all split friction disks. The cavities 48 in cavity split friction disks 190 and stator cavity split friction disks 194 and 195 limit the area of contact surfaces 92A,B, which also damps vibration.

As used herein, the phrases "make contact with", "touch", "coupled with", "interface with" and "engage" may be used interchangeably. Different cross-hatching is used throughout the figures to denote different parts but not necessarily to denote the same or different materials.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A disk brake system, comprising:
    a plurality of rotor friction disks;
    a pressure plate having a pressure plate thickness coupled axially to a rotor friction disk of the plurality of rotor friction disks having a rotor thickness; and
    a plurality of stator friction disks comprising a stator friction disk having a stator thickness, wherein the rotor friction disk and the stator friction disk are annular disks, wherein the locations of the stator friction disks alternate axially with locations of the rotor friction disks between the pressure plate and an end plate having an end plate thickness;
    wherein, the end plate thickness, the rotor thickness, the pressure plate thickness, and the stator thickness are measured axially, and the stator thickness is less than 15% greater than the pressure plate thickness,
    wherein at least one of the plurality of rotor friction disks and the plurality of stator friction disks is a split friction disk comprising a split friction disk first half and a split friction disk second half, and
    wherein the split friction disk first half and the split friction disk second half each comprise a disk half thickness that is substantially equal to the rotor thickness.

2. The disk brake system of claim 1, wherein the pressure plate thickness is greater than the rotor thickness.

3. The disk brake system of claim 1, wherein the stator thickness is less than 15% greater than the end plate thickness.

4. The disk brake system of claim 1, wherein the end plate thickness is greater than the rotor thickness.

5. The disk brake system of claim 1, wherein the split friction disk is located in a middle position of the disk brake system.

6. The disk brake system of claim 1, wherein all rotor friction disks and stator friction disks are split friction disks.

7. The disk brake system of claim 1, further comprising a damping feature located between the split friction disk first half and the split friction disk second half.

8. A disk brake system, comprising:
    a pressure plate coupled axially to a rotor friction disk having a rotor density;
    a stator friction disk having a stator density, located axially between the pressure plate and an end plate, wherein the rotor friction disk and the stator friction disk are annular disks, and the rotor friction disk and the stator friction disk are adjacent to one another and disposed coaxially, wherein the stator friction disk is a split friction disk comprising a split friction disk first half and a split friction disk second half; and
    a damping feature, having a dampening feature density, located axially between the split friction disk first half and the split friction disk second half,
    wherein the end plate comprises an endplate thickness, the rotor friction disk comprises a rotor thickness, and the stator friction disk comprises a stator thickness, and
    wherein the split friction disk first half and the split friction disk second half each comprise a disk half thickness that is substantially equal to the rotor thickness.

9. The disk brake system of claim 8, wherein the damping feature density is less than the rotor density and is less than the stator density.

10. The disk brake system of claim 8, wherein the end plate thickness is greater than the rotor thickness, and the stator thickness is less than 15% greater than the end plate thickness.

11. The disk brake system of claim 8, wherein the disk half thickness is greater than a half of the stator thickness.

12. The disk brake system of claim 11, wherein the split friction disk further comprises an annular-shaped disk half comprising:
    a friction surface; and
    a non-friction surface on a side opposite of the friction surface, the non-friction surface comprising:
        a first contact surface and a second contact surface; and
        a non-contact surface recessed from both the first contact surface and the second contact surface.

13. The disk brake system of claim 8, further comprising a plurality of rotor friction disks including the rotor friction disk and a plurality of stator friction disks including the stator friction disk, wherein the locations of the stator friction disks alternate axially with locations of the rotor friction disks, and there is one more rotor friction disk than there are stator friction disks.

14. The disk brake system of claim 13, wherein the split friction disk is located in a middle position of the disk brake system.

15. The disk brake system of claim 13, wherein a plurality of the split friction disks are positioned adjacent to at least one of the pressure plate and the end plate.

16. The disk brake system of claim 13, wherein a plurality of solid friction disks are positioned adjacent to at least one of the pressure plate and the end plate.

17. A wheel system, comprising:
a disk brake system, wherein the disk brake system comprises:
   a pressure plate, having pressure plate thickness, coupled to rotor friction disk;
   a stator friction disk, having a stator thickness, located between the pressure plate and an end plate, wherein the rotor friction disk and the stator friction disk are annular disks, and the rotor friction disk and the stator friction disk are adjacent to one another and disposed coaxially, wherein the stator friction disk is a split friction disk, wherein the pressure plate thickness and the stator thickness are measured axially, and the stator thickness is less than 15% greater than the pressure plate thickness; and
   a dampening feature located between a first half of the at least one split friction disk and a second half of the at least one split friction disk,
wherein the end plate comprises an endplate thickness, and the rotor friction disk comprises a rotor thickness, and
wherein the split friction disk first half and the split friction disk second half each comprise a disk half thickness that is substantially equal to the rotor thickness.

* * * * *